(12) United States Patent
Lawrence

(10) Patent No.: US 11,347,969 B2
(45) Date of Patent: May 31, 2022

(54) COMPUTER ARCHITECTURE FOR TRAINING A NODE IN A CORRELITHM OBJECT PROCESSING SYSTEM

(71) Applicant: BANK OF AMERICA CORPORATION, Charlotte, NC (US)

(72) Inventor: Patrick N. Lawrence, Plano, TX (US)

(73) Assignee: Bank of America Corporation, Charlotte, NC (US)

( * ) Notice: Subject to any disclaimer, the term of this patent is extended or adjusted under 35 U.S.C. 154(b) by 1107 days.

(21) Appl. No.: 15/927,282

(22) Filed: Mar. 21, 2018

(65) Prior Publication Data

US 2019/0294926 A1    Sep. 26, 2019

(51) Int. Cl.
| | | |
|---|---|---|
| G06K 9/62 | (2022.01) | |
| G06F 7/02 | (2006.01) | |
| G06F 16/23 | (2019.01) | |
| G06F 16/28 | (2019.01) | |

(52) U.S. Cl.
CPC ............. *G06K 9/6257* (2013.01); *G06F 7/02* (2013.01); *G06F 16/23* (2019.01); *G06F 16/288* (2019.01); *G06K 9/6215* (2013.01)

(58) Field of Classification Search
CPC .... G06K 9/6257; G06K 9/6215; G06F 16/23; G06F 16/288; G06F 7/02
See application file for complete search history.

(56) References Cited

U.S. PATENT DOCUMENTS

| | | | |
|---|---|---|---|
| 5,946,673 | A | 8/1999 | Francone et al. |
| 6,167,391 | A | 12/2000 | Lawrence |
| 6,941,287 | B1 | 9/2005 | Vaidyanathan et al. |
| 6,943,686 | B2 | 9/2005 | Allen |
| 6,947,913 | B1 | 9/2005 | Lawrence |
| 7,015,835 | B2 | 3/2006 | Lawrence et al. |
| 7,031,969 | B2 | 4/2006 | Lawrence et al. |
| 7,246,129 | B2 | 7/2007 | Lawrence et al. |
| 7,310,622 | B2 | 12/2007 | Lawrence et al. |
| 7,349,928 | B2 | 3/2008 | Lawrence et al. |
| 2003/0158850 | A1* | 8/2003 | Lawrence ............. G06F 16/313 707/E17.084 |

OTHER PUBLICATIONS

Lawrence, P. N., "Computer Architecture for Training a Correlithm Object Processing System," U.S. Appl. No. 15/927,584, filed Mar. 21, 2018, 54 pages.

(Continued)

*Primary Examiner* — David F Dunphy

(57) ABSTRACT

A correlithm object processing system that includes a trainer configured to receive a real world input value and a real world output value. The trainer is further configured to send the real world input value to a sensor engine and to receive a source correlithm object in response to sending the real world value to the sensor engine. A source correlithm object is a point in an n-dimensional space represented by a binary string. The trainer is further configured to send a real world output value to an actor engine and to receive a target correlithm object in response to sending the real world output value to the actor engine. A target correlithm object is a point in the n-dimensional space represented by a binary string. The trainer is further configured to generate an entry in a node table linking the source correlithm object with the target correlithm object.

20 Claims, 8 Drawing Sheets

(56) References Cited

OTHER PUBLICATIONS

Meersman, R. et al., "On the Move to Meaningful Internet Systems 2005: CoopIS, DOA and ODBASE," OTM Confederated International Conferences CoopIS, DOA and ODBASE Oct. 2005 Agia Napa, Cyprus, Proceedings, Part I, Oct. 31-Nov. 4, 2005, pp. 763-779.
Lawrence, P. N., "Correlithm Object Technology," Apr. 2004, 229 pages.

* cited by examiner

COMPUTER ARCHITECTURE FOR TRAINING A NODE IN A CORRELITHM OBJECT PROCESSING SYSTEM

TECHNICAL FIELD

The present disclosure relates generally to computer architectures for emulating a processing system, and more specifically to computer architectures for emulating a correlithm object processing system.

BACKGROUND

Conventional computers are highly attuned to using operations that require manipulating ordinal numbers, especially ordinal binary integers. The value of an ordinal number corresponds with its position in a set of sequentially ordered number values. These computers use ordinal binary integers to represent, manipulate, and store information. These computers rely on the numerical order of ordinal binary integers representing data to perform various operations such as counting, sorting, indexing, and mathematical calculations. Even when performing operations that involve other number systems (e.g. floating point), conventional computers still resort to using ordinal binary integers to perform any operations.

Ordinal based number systems only provide information about the sequence order of the numbers themselves based on their numeric values. Ordinal numbers do not provide any information about any other types of relationships for the data being represented by the numeric values such as similarity. For example, when a conventional computer uses ordinal numbers to represent data samples (e.g. images or audio signals), different data samples are represented by different numeric values. The different numeric values do not provide any information about how similar or dissimilar one data sample is from another. Unless there is an exact match in ordinal number values, conventional systems are unable to tell if a data sample matches or is similar to any other data samples. As a result, conventional computers are unable to use ordinal numbers by themselves for comparing different data samples and instead these computers rely on complex signal processing techniques. Determining whether a data sample matches or is similar to other data samples is not a trivial task and poses several technical challenges for conventional computers. These technical challenges result in complex processes that consume processing power which reduces the speed and performance of the system. The ability to compare unknown data samples to known data samples is crucial for many security applications such as face recognition, voice recognition, and fraud detection.

Thus, it is desirable to provide a solution that allows computing systems to efficiently determine how similar different data samples are to each other and to perform operations based on their similarity.

SUMMARY

Conventional computers are highly attuned to using operations that require manipulating ordinal numbers, especially ordinal binary integers. The value of an ordinal number corresponds with its position in a set of sequentially ordered number values. These computers use ordinal binary integers to represent, manipulate, and store information. These computers rely on the numerical order of ordinal binary integers representing data to perform various operations such as counting, sorting, indexing, and mathematical calculations. Even when performing operations that involve other number systems (e.g. floating point), conventional computers still resort to using ordinal binary integers to perform any operations.

Ordinal based number systems only provide information about the sequence order of the numbers themselves based on their numeric values. Ordinal numbers do not provide any information about any other types of relationships for the data being represented by the numeric values such as similarity. For example, when a conventional computer uses ordinal numbers to represent data samples (e.g. images or audio signals), different data samples are represented by different numeric values. The different numeric values do not provide any information about how similar or dissimilar one data sample is from another. Unless there is an exact match in ordinal number values, conventional systems are unable to tell if a data sample matches or is similar to any other data samples. As a result, conventional computers are unable to use ordinal numbers by themselves for comparing different data samples and instead these computers rely on complex signal processing techniques. Determining whether a data sample matches or is similar to other data samples is not a trivial task and poses several technical challenges for conventional computers. These technical challenges result in complex processes that consume processing power which reduces the speed and performance of the system. The ability to compare unknown data samples to known data samples is crucial for many applications such as security application (e.g. face recognition, voice recognition, and fraud detection).

The system described in the present application provides a technical solution that enables the system to efficiently determine how similar different objects are to each other and to perform operations based on their similarity. In contrast to conventional systems, the system uses an unconventional configuration to perform various operations using categorical numbers and geometric objects, also referred to as correlithm objects, instead of ordinal numbers. Using categorical numbers and correlithm objects on a conventional device involves changing the traditional operation of the computer to support representing and manipulating concepts as correlithm objects. A device or system may be configured to implement or emulate a special purpose computing device capable of performing operations using correlithm objects. Implementing or emulating a correlithm object processing system improves the operation of a device by enabling the device to perform non-binary comparisons (i.e. match or no match) between different data samples. This enables the device to quantify a degree of similarity between different data samples. This increases the flexibility of the device to work with data samples having different data types and/or formats, and also increases the speed and performance of the device when performing operations using data samples. These technical advantages and other improvements to the device are described in more detail throughout the disclosure.

In one embodiment, the system is configured to use binary integers as categorical numbers rather than ordinal numbers which enables the system to determine how similar a data sample is to other data samples. Categorical numbers provide information about similar or dissimilar different data samples are from each other. For example, categorical numbers can be used in facial recognition applications to represent different images of faces and/or features of the faces. The system provides a technical advantage by allowing the system to assign correlithm objects represented by categorical numbers to different data samples based on how similar they are to other data samples. As an example, the system is able to assign correlithm objects to different images of people such that the correlithm objects can be directly used to determine how similar the people in the images are to each other. In other words, the system is able to use correlithm objects in facial recognition applications to quickly determine whether a captured image of a person matches any previously stored images without relying on conventional signal processing techniques.

Correlithm object processing systems use new types of data structures called correlithm objects that improve the way a device operates, for example, by enabling the device to perform non-binary data set comparisons and to quantify the similarity between different data samples. Correlithm objects are data structures designed to improve the way a device stores, retrieves, and compares data samples in memory. Correlithm objects also provide a data structure that is independent of the data type and format of the data samples they represent. Correlithm objects allow data samples to be directly compared regardless of their original data type and/or format.

A correlithm object processing system uses a combination of a sensor table, a node table, and/or an actor table to provide a specific set of rules that improve computer-related technologies by enabling devices to compare and to determine the degree of similarity between different data samples regardless of the data type and/or format of the data sample they represent. The ability to directly compare data samples having different data types and/or formatting is a new functionality that cannot be performed using conventional computing systems and data structures.

In addition, correlithm object processing system uses a combination of a sensor table, a node table, and/or an actor table to provide a particular manner for transforming data samples between ordinal number representations and correlithm objects in a correlithm object domain. Transforming data samples between ordinal number representations and correlithm objects involves fundamentally changing the data type of data samples between an ordinal number system and a categorical number system to achieve the previously described benefits of the correlithm object processing system.

Using correlithm objects allows the system or device to compare data samples (e.g. images) even when the input data sample does not exactly match any known or previously stored input values. For example, an input data sample that is an image may have different lighting conditions than the previously stored images. The differences in lighting conditions can make images of the same person appear different from each other. The device uses an unconventional configuration that implements a correlithm object processing system that uses the distance between the data samples which are represented as correlithm objects and other known data samples to determine whether the input data sample matches or is similar to the other known data samples. Implementing a correlithm object processing system fundamentally changes the device and the traditional data processing paradigm. Implementing the correlithm object processing system improves the operation of the device by enabling the device to perform non-binary comparisons of data samples. In other words, the device is able to determine how similar the data samples are to each other even when the data samples are not exact matches. In addition, the device is able to quantify how similar data samples are to one another. The ability to determine how similar data samples are to each other is unique and distinct from conventional computers that can only perform binary comparisons to identify exact matches.

The problems associated with comparing data sets and identifying matches based on the comparison are problems necessarily rooted in computer technologies. As described above, conventional systems are limited to a binary comparison that can only determine whether an exact match is found. Emulating a correlithm object processing system provides a technical solution that addresses problems associated with comparing data sets and identifying matches. Using correlithm objects to represent data samples fundamentally changes the operation of a device and how the device views data samples. By implementing a correlithm object processing system, the device can determine the distance between the data samples and other known data samples to determine whether the input data sample matches or is similar to the other known data samples. In addition, the device is able to determine a degree of similarity that quantifies how similar different data samples are to one another.

In one embodiment, the system is configured to use a trainer to extend the functionality of a device emulating a correlithm object processing system. Correlithm object processing systems typically use a combination of sensors, nodes, and actors to perform operations. Each of these components uses its respective table to transform data between real world values and correlithm objects. One technical problem occurs when a user wants to extend the capabilities of a correlithm object processing systems by introducing a new input and/or output. Configuring a correlithm object processing system to support a new input or output involves updating and modifying affected components. This process involves synchronizing and exchanging information across multiple components. However, individual components lack the ability to coordinate with other components to exchange information to properly update their tables. A trainer provides a technical solution that trains sensors, nodes, and actors to support new inputs and outputs by creating new entries in their corresponding tables. The trainer facilitates synchronizing and exchanging information among the components in a correlithm object processing system to ensure each component has the information it needs to update its table. By modifying sensor tables, node tables, and/or actor tables, the trainer increases the functionality of a device by expanding the capabilities of its correlithm object processing system.

Certain embodiments of the present disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
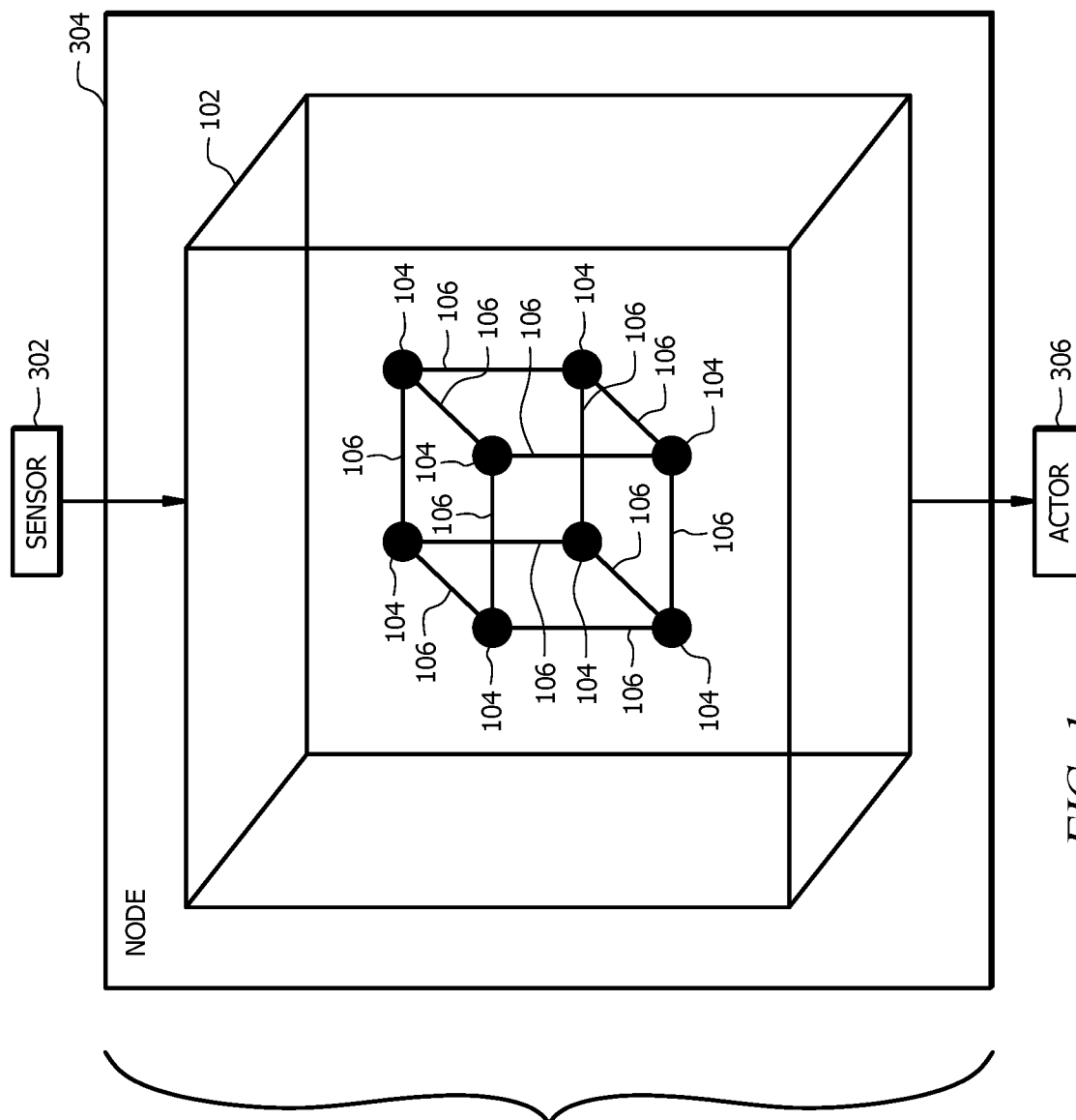
FIG. 1 is a schematic view of an embodiment of a special purpose computer implementing correlithm objects in an n-dimensional space.
Figure 1:
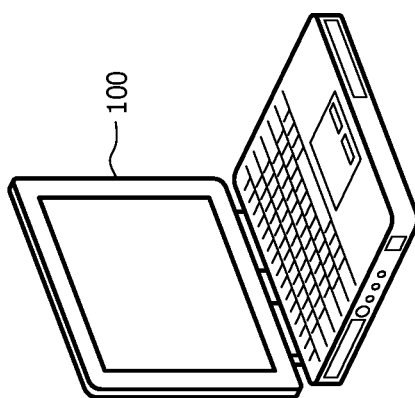

FIGS. 1-5 generally describe various embodiments of how a correlithm object processing system may be implemented or emulated in hardware, such as a special purpose computer. FIG. 1 is a schematic view of an embodiment of a user device 100 implementing correlithm objects 104 in an n-dimensional space 102. Examples of user devices 100 include, but are not limited to, desktop computers, mobile phones, tablet computers, laptop computers, or other special purpose computer platform. The user device 100 is configured to implement or emulate a correlithm object processing system that uses categorical numbers to represent data samples as correlithm objects 104 in a high-dimensional space 102, for example a high-dimensional binary cube. Additional information about the correlithm object processing system is described in FIG. 3. Additional information about configuring the user device 100 to implement or emulate a correlithm object processing system is described in FIG. 5.

Conventional computers rely on the numerical order of ordinal binary integers representing data to perform various operations such as counting, sorting, indexing, and mathematical calculations. Even when performing operations that involve other number systems (e.g. floating point), conventional computers still resort to using ordinal binary integers to perform any operations. Ordinal based number systems only provide information about the sequence order of the numbers themselves based on their numeric values. Ordinal numbers do not provide any information about any other types of relationships for the data being represented by the numeric values, such as similarity. For example, when a conventional computer uses ordinal numbers to represent data samples (e.g. images or audio signals), different data samples are represented by different numeric values. The different numeric values do not provide any information about how similar or dissimilar one data sample is from another. In other words, conventional computers are only able to make binary comparisons of data samples which only results in determining whether the data samples match or do not match. Unless there is an exact match in ordinal number values, conventional systems are unable to tell if a data sample matches or is similar to any other data samples. As a result, conventional computers are unable to use ordinal numbers by themselves for determining similarity between different data samples, and instead these computers rely on complex signal processing techniques. Determining whether a data sample matches or is similar to other data samples is not a trivial task and poses several technical challenges for conventional computers. These technical challenges result in complex processes that consume processing power which reduces the speed and performance of the system.

In contrast to conventional systems, the user device 100 operates as a special purpose machine for implementing or emulating a correlithm object processing system. Implementing or emulating a correlithm object processing system improves the operation of the user device 100 by enabling the user device 100 to perform non-binary comparisons (i.e. match or no match) between different data samples. This enables the user device 100 to quantify a degree of similarity between different data samples. This increases the flexibility of the user device 100 to work with data samples having different data types and/or formats, and also increases the speed and performance of the user device 100 when performing operations using data samples. These improvements and other benefits to the user device 100 are described in more detail below and throughout the disclosure.

For example, the user device 100 employs the correlithm object processing system to allow the user device 100 to compare data samples even when the input data sample does not exactly match any known or previously stored input values. Implementing a correlithm object processing system fundamentally changes the user device 100 and the traditional data processing paradigm. Implementing the correlithm object processing system improves the operation of the user device 100 by enabling the user device 100 to perform non-binary comparisons of data samples. In other words, the user device 100 is able to determine how similar the data samples are to each other even when the data samples are not exact matches. In addition, the user device 100 is able to quantify how similar data samples are to one another. The ability to determine how similar data samples are to each others is unique and distinct from conventional computers that can only perform binary comparisons to identify exact matches.

The user device's 100 ability to perform non-binary comparisons of data samples also fundamentally changes traditional data searching paradigms. For example, conventional search engines rely on finding exact matches or exact partial matches of search tokens to identify related data samples. For instance, conventional text-based search engine are limited to finding related data samples that have text that exactly matches other data samples. These search engines only provide a binary result that identifies whether or not an exact match was found based on the search token. Implementing the correlithm object processing system improves the operation of the user device 100 by enabling the user device 100 to identify related data samples based on how similar the search token is to other data sample. These improvements result in increased flexibility and faster search time when using a correlithm object processing system. The ability to identify similarities between data samples expands the capabilities of a search engine to include data samples that may not have an exact match with a search token but are still related and similar in some aspects. The user device 100 is also able to quantify how similar data samples are to each other based on characteristics besides exact matches to the search token. Implementing the correlithm object processing system involves operating the user device 100 in an unconventional manner to achieve these technological improvements as well as other benefits described below for the user device 100.

Computing devices typically rely on the ability to compare data sets (e.g. data samples) to one another for processing. For example, in security or authentication applications a computing device is configured to compare an input of an unknown person to a data set of known people (or biometric information associated with these people). The problems associated with comparing data sets and identifying matches based on the comparison are problems necessarily rooted in computer technologies. As described above, conventional systems are limited to a binary comparison that can only determine whether an exact match is found. As an example, an input data sample that is an image of a person may have different lighting conditions than previously stored images. In this example, different lighting conditions can make images of the same person appear different from each other. Conventional computers are unable to distinguish between two images of the same person with different lighting conditions and two images of two different people without complicated signal processing. In both of these cases, conventional computers can only determine that the images are different. This is because conventional computers rely on manipulating ordinal numbers for processing.

In contrast, the user device 100 uses an unconventional configuration that uses correlithm objects to represent data samples. Using correlithm objects to represent data samples fundamentally changes the operation of the user device 100 and how the device views data samples. By implementing a correlithm object processing system, the user device 100 can determine the distance between the data samples and other known data samples to determine whether the input data sample matches or is similar to the other known data samples, as explained in detail below. Unlike the conventional computers described in the previous example, the user device 100 is able to distinguish between two images of the same person with different lighting conditions and two images of two different people by using correlithm objects 104. Correlithm objects allow the user device 100 to determine whether there are any similarities between data samples, such as between two images that are different from each other in some respects but similar in other respects. For example, the user device 100 is able to determine that despite different lighting conditions, the same person is present in both images.

In addition, the user device 100 is able to determine a degree of similarity that quantifies how similar different data samples are to one another. Implementing a correlithm object processing system in the user device 100 improves the operation of the user device 100 when comparing data sets and identifying matches by allowing the user device 100 to perform non-binary comparisons between data sets and to quantify the similarity between different data samples. In addition, using a correlithm object processing system results in increased flexibility and faster search times when comparing data samples or data sets. Thus, implementing a correlithm object processing system in the user device 100 provides a technical solution to a problem necessarily rooted in computer technologies.

The ability to implement a correlithm object processing system provides a technical advantage by allowing the system to identify and compare data samples regardless of whether an exact match has been previous observed or stored. In other words, using the correlithm object processing system the user device 100 is able to identify similar data samples to an input data sample in the absence of an exact match. This functionality is unique and distinct from conventional computers that can only identify data samples with exact matches.

Examples of data samples include, but are not limited to, images, files, text, audio signals, biometric signals, electric signals, or any other suitable type of data. A correlithm object 104 is a point in the n-dimensional space 102, sometimes called an "n-space." The value of represents the number of dimensions of the space. For example, an n-dimensional space 102 may be a 3-dimensional space, a 50-dimensional space, a 100-dimensional space, or any other suitable dimension space. The number of dimensions depends on its ability to support certain statistical tests, such as the distances between pairs of randomly chosen points in the space approximating a normal distribution. In some embodiments, increasing the number of dimensions in the n-dimensional space 102 modifies the statistical properties of the system to provide improved results. Increasing the number of dimensions increases the probability that a correlithm object 104 is similar to other adjacent correlithm objects 104. In other words, increasing the number of dimensions increases the correlation between how close a pair of correlithm objects 104 are to each other and how similar the correlithm objects 104 are to each other.

Correlithm object processing systems use new types of data structures called correlithm objects 104 that improve the way a device operates, for example, by enabling the device to perform non-binary data set comparisons and to quantify the similarity between different data samples. Correlithm objects 104 are data structures designed to improve the way a device stores, retrieves, and compares data samples in memory. Unlike conventional data structures, correlithm objects 104 are data structures where objects can be expressed in a high-dimensional space such that distance 106 between points in the space represent the similarity between different objects or data samples. In other words, the distance 106 between a pair of correlithm objects 104 in the n-dimensional space 102 indicates how similar the correlithm objects 104 are from each other and the data samples they represent. Correlithm objects 104 that are close to each other are more similar to each other than correlithm objects 104 that are further apart from each other. For example, in a facial recognition application, correlithm objects 104 used to represent images of different types of glasses may be relatively close to each other compared to correlithm objects 104 used to represent images of other features such as facial hair. An exact match between two data samples occurs when their corresponding correlithm objects 104 are the same or have no distance between them. When two data samples are not exact matches but are similar, the distance between their correlithm objects 104 can be used to indicate their similarities. In other words, the distance 106 between correlithm objects 104 can be used to identify both data samples that exactly match each other as well as data samples that do not match but are similar. This feature is unique to a correlithm processing system and is unlike conventional computers that are unable to detect when data samples are different but similar in some aspects.

Correlithm objects 104 also provide a data structure that is independent of the data type and format of the data samples they represent. Correlithm objects 104 allow data samples to be directly compared regardless of their original data type and/or format. In some instances, comparing data samples as correlithm objects 104 is computationally more efficient and faster than comparing data samples in their original format. For example, comparing images using conventional data structures involves significant amounts of image processing which is time consuming and consumes processing resources. Thus, using correlithm objects 104 to represent data samples provides increased flexibility and improved performance compared to using other conventional data structures.

In one embodiment, correlithm objects 104 may be represented using categorical binary strings. The number of bits used to represent the correlithm object 104 corresponds with the number of dimensions of the n-dimensional space 102 where the correlithm object 102 is located. For example, each correlithm object 104 may be uniquely identified using a 64-bit string in a 64-dimensional space 102. As another example, each correlithm object 104 may be uniquely identified using a 10-bit string in a 10-dimensional space 102. In other examples, correlithm objects 104 can be identified using any other suitable number of bits in a string that corresponds with the number of dimensions in the n-dimensional space 102.

In this configuration, the distance 106 between two correlithm objects 104 can be determined based on the differences between the bits of the two correlithm objects 104. In other words, the distance 106 between two correlithm objects can be determined based on how many individual bits differ between the correlithm objects 104. The distance 106 between two correlithm objects 104 can be computed using Hamming distance or any other suitable technique.

As an example using a 10-dimensional space 102, a first correlithm object 104 is represented by a first 10-bit string (1001011011) and a second correlithm object 104 is represented by a second 10-bit string (1000011011). The Hamming distance corresponds with the number of bits that differ between the first correlithm object 104 and the second correlithm object 104. In other words, the Hamming distance between the first correlithm object 104 and the second correlithm object 104 can be computed as follows:

$$1001011011$$
$$1000011011$$
$$\overline{\phantom{0000000000}}$$
$$0001000000$$

In this example, the Hamming distance is equal to one because only one bit differs between the first correlithm object 104 and the second correlithm object. As another example, a third correlithm object 104 is represented by a third 10-bit string (0110100100). In this example, the Hamming distance between the first correlithm object 104 and the third correlithm object 104 can be computed as follows:

$$1001011011$$
$$0110100100$$
$$\overline{\phantom{0000000000}}$$
$$1111111111$$

The Hamming distance is equal to ten because all of the bits are different between the first correlithm object 104 and the third correlithm object 104. In the previous example, a Hamming distance equal to one indicates that the first correlithm object 104 and the second correlithm object 104 are close to each other in the n-dimensional space 102, which means they are similar to each other. In the second example, a Hamming distance equal to ten indicates that the first correlithm object 104 and the third correlithm object 104 are further from each other in the n-dimensional space 102 and are less similar to each other than the first correlithm object 104 and the second correlithm object 104. In other words, the similarity between a pair of correlithm objects can be readily determined based on the distance between the pair correlithm objects.

As another example, the distance between a pair of correlithm objects 104 can be determined by performing an XOR operation between the pair of correlithm objects 104 and counting the number of logical high values in the binary string. The number of logical high values indicates the number of bits that are different between the pair of correlithm objects 104 which also corresponds with the Hamming distance between the pair of correlithm objects 104.

In another embodiment, the distance 106 between two correlithm objects 104 can be determined using a Minkowski distance such as the Euclidean or "straight-line" distance between the correlithm objects 104. For example, the distance 106 between a pair of correlithm objects 104 may be determined by calculating the square root of the sum of squares of the coordinate difference in each dimension.

The user device 100 is configured to implement or emulate a correlithm object processing system that comprises one or more sensors 302, nodes 304, and/or actors 306 in order to convert data samples between real world values or representations and to correlithm objects 104 in a correlithm object domain. Sensors 302 are generally configured to convert real world data samples to the correlithm object domain. Nodes 304 are generally configured to process or perform various operations on correlithm objects in the correlithm object domain. Actors 306 are generally configured to convert correlithm objects 104 into real world values or representations. Additional information about sensors 302, nodes 304, and actors 306 is described in FIG. 3.

Performing operations using correlithm objects 104 in a correlithm object domain allows the user device 100 to identify relationships between data samples that cannot be identified using conventional data processing systems. For example, in the correlithm object domain, the user device 100 is able to identify not only data samples that exactly match an input data sample, but also other data samples that have similar characteristics or features as the input data samples. Conventional computers are unable to identify these types of relationships readily. Using correlithm objects 104 improves the operation of the user device 100 by enabling the user device 100 to efficiently process data samples and identify relationships between data samples without relying on signal processing techniques that require a significant amount of processing resources. These benefits allow the user device 100 to operate more efficiently than conventional computers by reducing the amount of processing power and resources that are needed to perform various operations.

Figure 2:
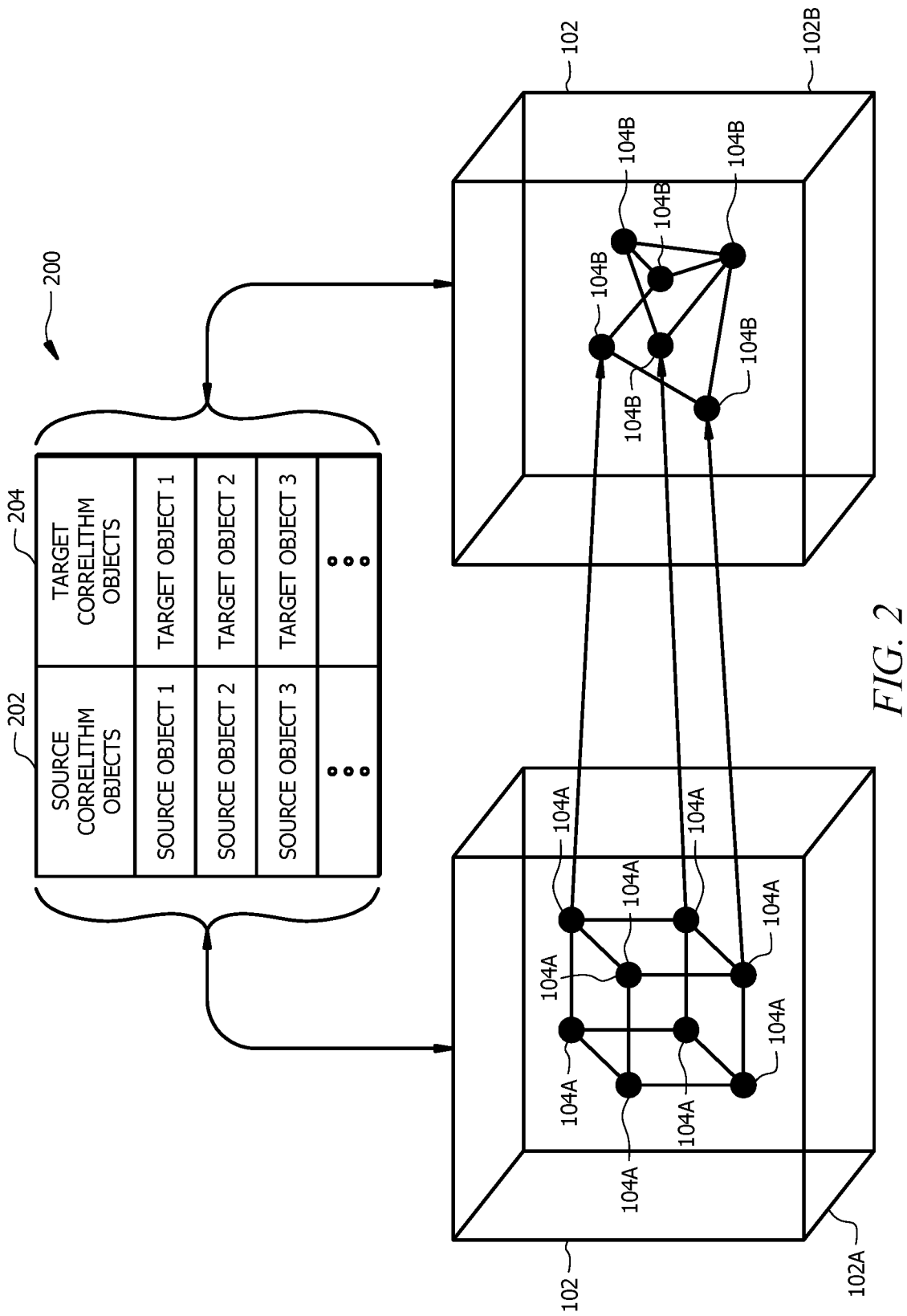
FIG. 2 is a perspective view of an embodiment of a mapping between correlithm objects in different n-dimensional spaces.

FIG. 2 is a schematic view of an embodiment of a mapping between correlithm objects 104 in different n-dimensional spaces 102. When implementing a correlithm object processing system, the user device 100 performs operations within the correlithm object domain using correlithm objects 104 in different n-dimensional spaces 102. As an example, the user device 100 may convert different types of data samples having real world values into correlithm objects 104 in different n-dimensional spaces 102. For instance, the user device 100 may convert data samples of text into a first set of correlithm objects 104 in a first n-dimensional space 102 and data samples of audio samples as a second set of correlithm objects 104 in a second n-dimensional space 102. Conventional systems require data samples to be of the same type and/or format in order to perform any kind of operation on the data samples. In some instances, some types of data samples cannot be compared because there is no common format available. For example, conventional computers are unable to compare data samples of images and data samples of audio samples because there is no common format. In contrast, the user device 100 implementing a correlithm object processing system is able to compare and perform operations using correlithm objects 104 in the correlithm object domain regardless of the type or format of the original data samples.

In FIG. 2, a first set of correlithm objects 104A are defined within a first n-dimensional space 102A and a second set of correlithm objects 104B are defined within a second n-dimensional space 102B. The n-dimensional spaces may have the same number of dimensions or a different number of dimensions. For example, the first n-dimensional space 102A and the second n-dimensional space 102B may both be three dimensional spaces. As another example, the first n-dimensional space 102A may be a three-dimensional space and the second n-dimensional space 102B may be a nine dimensional space. Correlithm objects 104 in the first n-dimensional space 102A and second n-dimensional space 102B are mapped to each other. In other words, a correlithm object 104A in the first n-dimensional space 102A may reference or be linked with a particular correlithm object 104B in the second n-dimensional space 102B. The correlithm objects 104 may also be linked with and referenced with other correlithm objects 104 in other n-dimensional spaces 102.

In one embodiment, a data structure such as table 200 may be used to map or link correlithm objects 104 in different n-dimensional spaces 102. In some instances, table 200 is referred to as a node table. Table 200 is generally configured to identify a first plurality of correlithm objects 104 in a first n-dimensional space 102 and a second plurality of correlithm objects 104 in a second n-dimensional space 102. Each correlithm object 104 in the first n-dimensional space 102 is linked with a correlithm object 104 is the second n-dimensional space 102. For example, table 200 may be configured with a first column 202 that lists correlithm objects 104A as source correlithm objects and a second column 204 that lists corresponding correlithm objects 104B as target correlithm objects. In other examples, table 200 may be configured in any other suitable manner or may be implemented using any other suitable data structure. In some embodiments, one or more mapping functions may be used to convert between a correlithm object 104 in a first n-dimensional space and a correlithm object 104 is a second n-dimensional space.

Figure 3:
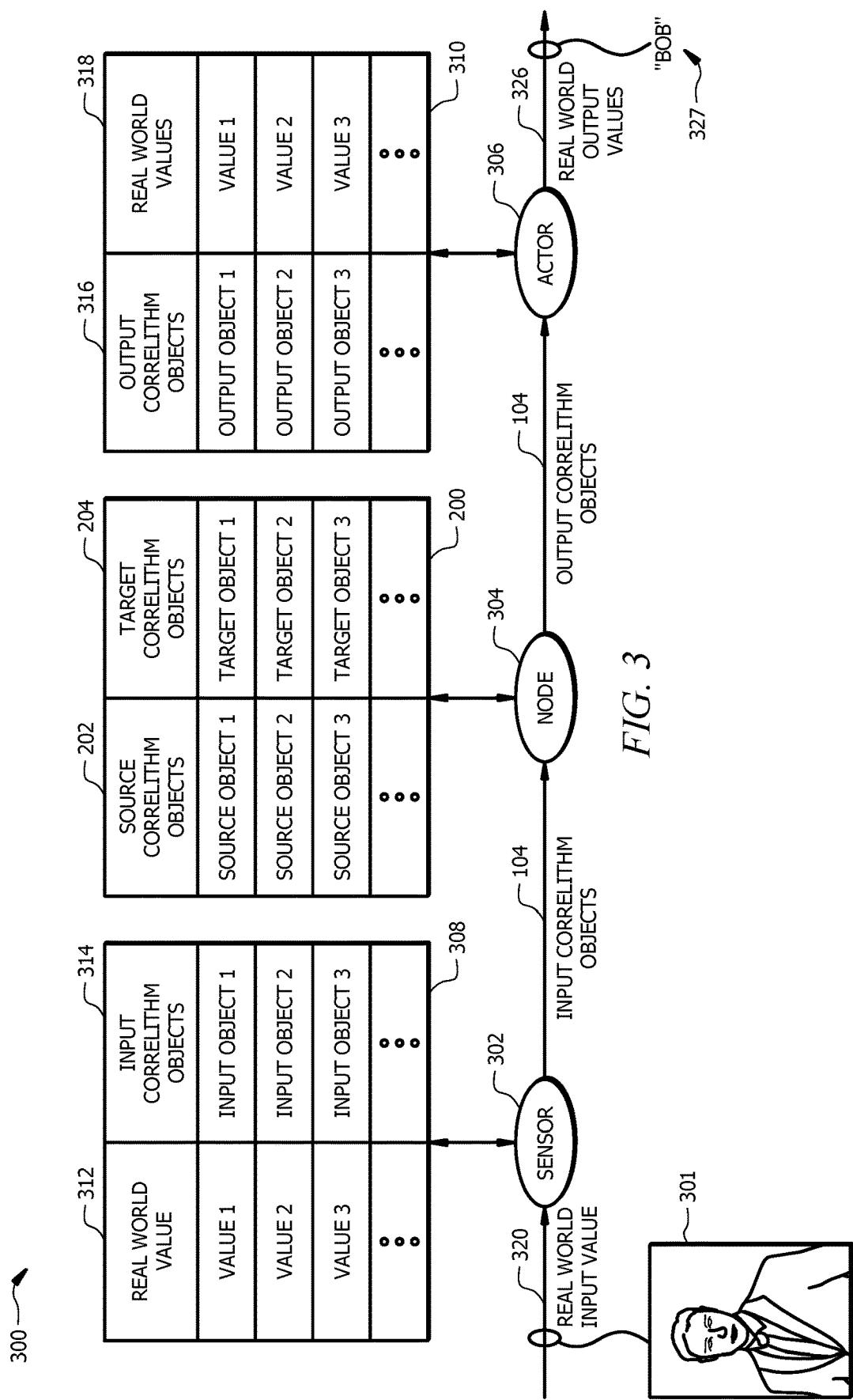
FIG. 3 is a schematic view of an embodiment of a correlithm object processing system.

FIG. 3 is a schematic view of an embodiment of a correlithm object processing system 300 that is implemented by a user device 100 to perform operations using correlithm objects 104. The system 300 generally comprises a sensor 302, a node 304, and an actor 306. The system 300 may be configured with any suitable number and/or configuration of sensors 302, nodes 304, and actors 306. An example of the system 300 in operation is described in FIG. 4. In one embodiment, a sensor 302, a node 304, and an actor 306 may all be implemented on the same device (e.g. user device 100). In other embodiments, a sensor 302, a node 304, and an actor 306 may each be implemented on different devices in signal communication with each other for example over a network. In other embodiments, different devices may be configured to implement any combination of sensors 302, nodes 304, and actors 306.

Sensors 302 serve as interfaces that allow a user device 100 to convert real world data samples into correlithm objects 104 that can be used in the correlithm object domain. Sensors 302 enable the user device 100 to compare and perform operations using correlithm objects 104 regardless of the data type or format of the original data sample. Sensors 302 are configured to receive a real world value 320 representing a data sample as an input, to determine a correlithm object 104 based on the real world value 320, and to output the correlithm object 104. For example, the sensor 302 may receive an image 301 of a person and output a correlithm object 322 to the node 304 or actor 306. In one embodiment, sensors 302 are configured to use sensor tables 308 that link a plurality of real world values with a plurality of correlithm objects 104 in an n-dimensional space 102. Real world values are any type of signal, value, or representation of data samples. Examples of real world values include, but are not limited to, images, pixel values, text, audio signals, electrical signals, and biometric signals. As an example, a sensor table 308 may be configured with a first column 312 that lists real world value entries corresponding with different images and a second column 314 that lists corresponding correlithm objects 104 as input correlithm objects. In other examples, sensor tables 308 may be configured in any other suitable manner or may be implemented using any other suitable data structure. In some embodiments, one or more mapping functions may be used to translate between a real world value 320 and a correlithm object 104 in an n-dimensional space. Additional information for implementing or emulating a sensor 302 in hardware is described in FIG. 5.

Nodes 304 are configured to receive a correlithm object 104 (e.g. an input correlithm object 104), to determine another correlithm object 104 based on the received correlithm object 104, and to output the identified correlithm object 104 (e.g. an output correlithm object 104). In one embodiment, nodes 304 are configured to use node tables 200 that link a plurality of correlithm objects 104 from a first n-dimensional space 102 with a plurality of correlithm objects 104 in a second n-dimensional space 102. A node table 200 may be configured similar to the table 200 described in FIG. 2. Additional information for implementing or emulating a node 304 in hardware is described in FIG. 5.

Actors 306 serve as interfaces that allow a user device 100 to convert correlithm objects 104 in the correlithm object domain back to real world values or data samples. Actors 306 enable the user device 100 to convert from correlithm objects 104 into any suitable type of real world value. Actors 306 are configured to receive a correlithm object 104 (e.g. an output correlithm object 104), to determine a real world output value 326 based on the received correlithm object 104, and to output the real world output value 326. The real world output value 326 may be a different data type or representation of the original data sample. As an example, the real world input value 320 may be an image 301 of a person and the resulting real world output value 326 may be text 327 and/or an audio signal identifying the person. In one embodiment, actors 306 are configured to use actor tables 310 that link a plurality of correlithm objects 104 in an n-dimensional space 102 with a plurality of real world values. As an example, an actor table 310 may be configured with a first column 316 that lists correlithm objects 104 as output correlithm objects and a second column 318 that lists real world values. In other examples, actor tables 310 may be configured in any other suitable manner or may be implemented using any other suitable data structure. In some embodiments, one or more mapping functions may be employed to translate between a correlithm object 104 in an n-dimensional space and a real world output value 326. Additional information for implementing or emulating an actor 306 in hardware is described in FIG. 5.

A correlithm object processing system 300 uses a combination of a sensor table 308, a node table 200, and/or an actor table 310 to provide a specific set of rules that improve computer-related technologies by enabling devices to compare and to determine the degree of similarity between different data samples regardless of the data type and/or format of the data sample they represent. The ability to directly compare data samples having different data types and/or formatting is a new functionality that cannot be performed using conventional computing systems and data structures. Conventional systems require data samples to be of the same type and/or format in order to perform any kind of operation on the data samples. In some instances, some types of data samples are incompatible with each other and cannot be compared because there is no common format available. For example, conventional computers are unable to compare data samples of images with data samples of audio samples because there is no common format available. In contrast, a device implementing a correlithm object processing system uses a combination of a sensor table 308, a node table 200, and/or an actor table 310 to compare and perform operations using correlithm objects 104 in the correlithm object domain regardless of the type or format of the original data samples. The correlithm object processing system 300 uses a combination of a sensor table 308, a node table 200, and/or an actor table 310 as a specific set of rules that provides a particular solution to dealing with different types of data samples and allows devices to perform operations on different types of data samples using correlithm objects 104 in the correlithm object domain. In some instances, comparing data samples as correlithm objects 104 is computationally more efficient and faster than comparing data samples in their original format. Thus, using correlithm objects 104 to represent data samples provides increased flexibility and improved performance compared to using other conventional data structures. The specific set of rules used by the correlithm object processing system 300 go beyond simply using routine and conventional activities in order to achieve this new functionality and performance improvements.

In addition, correlithm object processing system 300 uses a combination of a sensor table 308, a node table 200, and/or an actor table 310 to provide a particular manner for transforming data samples between ordinal number representations and correlithm objects 104 in a correlithm object domain. For example, the correlithm object processing system 300 may be configured to transform a representation of a data sample into a correlithm object 104, to perform various operations using the correlithm object 104 in the correlithm object domain, and to transform a resulting correlithm object 104 into another representation of a data sample. Transforming data samples between ordinal number representations and correlithm objects 104 involves fundamentally changing the data type of data samples between an ordinal number system and a categorical number system to achieve the previously described benefits of the correlithm object processing system 300.

Figure 4:
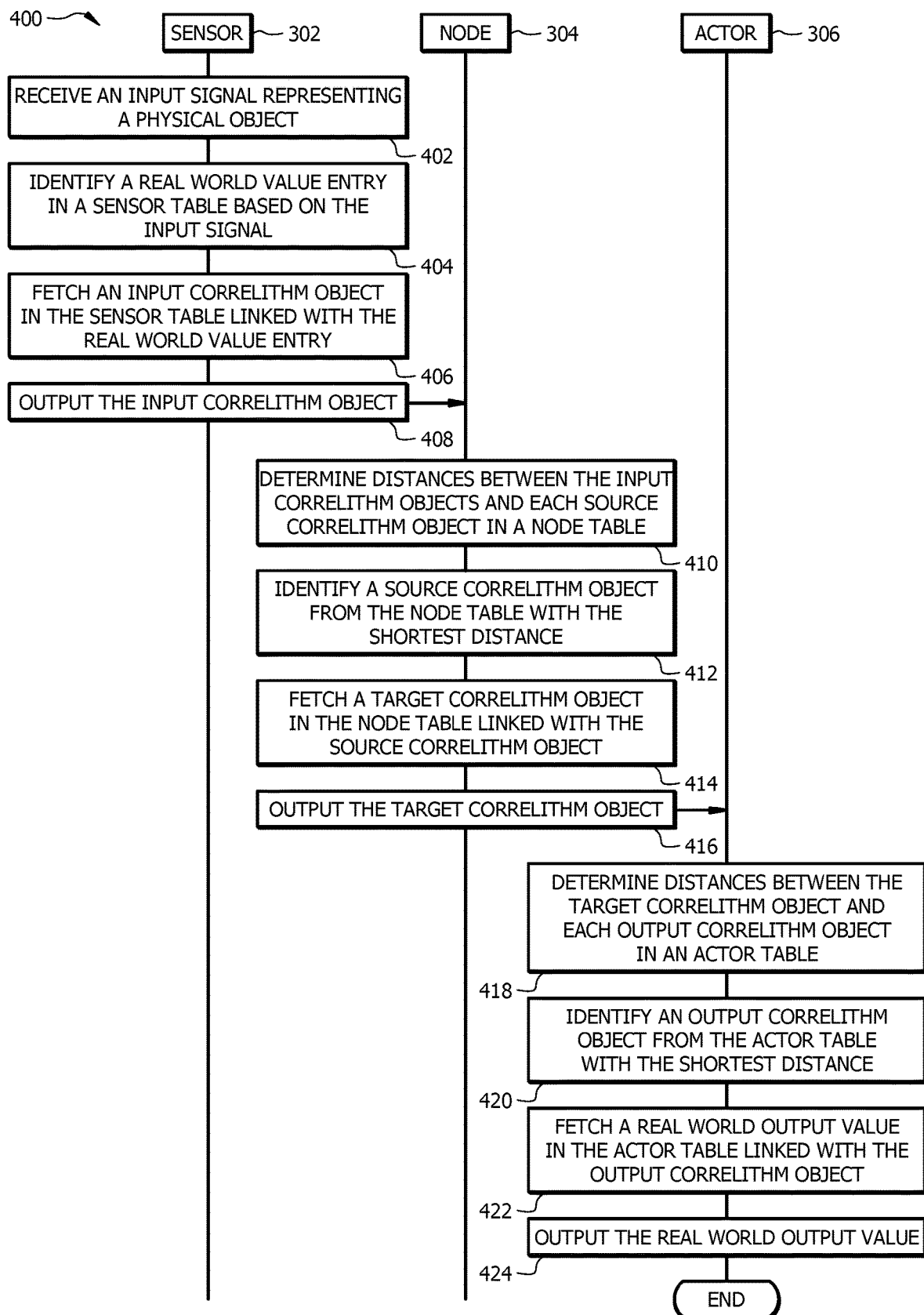
FIG. 4 is a protocol diagram of an embodiment of a correlithm object process flow.

FIG. 4 is a protocol diagram of an embodiment of a correlithm object process flow 400. A user device 100 implements process flow 400 to emulate a correlithm object processing system 300 to perform operations using correlithm object 104 such as facial recognition. The user device 100 implements process flow 400 to compare different data samples (e.g. images, voice signals, or text) to each other and to identify other objects based on the comparison. Process flow 400 provides instructions that allows user devices 100 to achieve the improved technical benefits of a correlithm object processing system 300.

Conventional systems are configured to use ordinal numbers for identifying different data samples. Ordinal based number systems only provide information about the sequence order of numbers based on their numeric values, and do not provide any information about any other types of relationships for the data samples being represented by the numeric values such as similarity. In contrast, a user device 100 can implement or emulate the correlithm object processing system 300 which provides an unconventional solution that uses categorical numbers and correlithm objects 104 to represent data samples. For example, the system 300 may be configured to use binary integers as categorical numbers to generate correlithm objects 104 which enables the user device 100 to perform operations directly based on similarities between different data samples. Categorical numbers provide information about how similar different data sample are from each other. Correlithm objects 104 generated using categorical numbers can be used directly by the system 300 for determining how similar different data samples are from each other without relying on exact matches, having a common data type or format, or conventional signal processing techniques.

A non-limiting example is provided to illustrate how the user device 100 implements process flow 400 to emulate a correlithm object processing system 300 to perform facial recognition on an image to determine the identity of the person in the image. In other examples, the user device 100 may implement process flow 400 to emulate a correlithm object processing system 300 to perform voice recognition, text recognition, or any other operation that compares different objects.

At step 402, a sensor 302 receives an input signal representing a data sample. For example, the sensor 302 receives an image of person's face as a real world input value 320. The input signal may be in any suitable data type or format. In one embodiment, the sensor 302 may obtain the input signal in real-time from a peripheral device (e.g. a camera). In another embodiment, the sensor 302 may obtain the input signal from a memory or database.

At step 404, the sensor 302 identifies a real world value entry in a sensor table 308 based on the input signal. In one embodiment, the system 300 identifies a real world value entry in the sensor table 308 that matches the input signal. For example, the real world value entries may comprise previously stored images. The sensor 302 may compare the received image to the previously stored images to identify a real world value entry that matches the received image. In one embodiment, when the sensor 302 does not find an exact match, the sensor 302 finds a real world value entry that closest matches the received image.

At step 406, the sensor 302 identifies and fetches an input correlithm object 104 in the sensor table 308 linked with the real world value entry. At step 408, the sensor 302 sends the identified input correlithm object 104 to the node 304. In one embodiment, the identified input correlithm object 104 is represented in the sensor table 308 using a categorical binary integer string. The sensor 302 sends the binary string representing to the identified input correlithm object 104 to the node 304.

At step 410, the node 304 receives the input correlithm object 104 and determines distances 106 between the input correlithm object 104 and each source correlithm object 104 in a node table 200. In one embodiment, the distance 106 between two correlithm objects 104 can be determined based on the differences between the bits of the two correlithm objects 104. In other words, the distance 106 between two correlithm objects can be determined based on how many individual bits differ between a pair of correlithm objects 104. The distance 106 between two correlithm objects 104 can be computed using Hamming distance or any other suitable technique. In another embodiment, the distance 106 between two correlithm objects 104 can be determined using a Minkowski distance such as the Euclidean or "straight-line" distance between the correlithm objects 104. For example, the distance 106 between a pair of correlithm objects 104 may be determined by calculating the square root of the sum of squares of the coordinate difference in each dimension.

At step 412, the node 304 identifies a source correlithm object 104 from the node table 200 with the shortest distance 106. A source correlithm object 104 with the shortest distance from the input correlithm object 104 is a correlithm object 104 either matches or most closely matches the received input correlithm object 104.

At step 414, the node 304 identifies and fetches a target correlithm object 104 in the node table 200 linked with the source correlithm object 104. At step 416, the node 304 outputs the identified target correlithm object 104 to the actor 306. In this example, the identified target correlithm object 104 is represented in the node table 200 using a categorical binary integer string. The node 304 sends the binary string representing to the identified target correlithm object 104 to the actor 306.

At step 418, the actor 306 receives the target correlithm object 104 and determines distances between the target correlithm object 104 and each output correlithm object 104 in an actor table 310. The actor 306 may compute the distances between the target correlithm object 104 and each output correlithm object 104 in an actor table 310 using a process similar to the process described in step 410.

At step 420, the actor 306 identifies an output correlithm object 104 from the actor table 310 with the shortest distance 106. An output correlithm object 104 with the shortest distance from the target correlithm object 104 is a correlithm object 104 either matches or most closely matches the received target correlithm object 104.

At step 422, the actor 306 identifies and fetches a real world output value in the actor table 310 linked with the output correlithm object 104. The real world output value may be any suitable type of data sample that corresponds with the original input signal. For example, the real world output value may be text that indicates the name of the person in the image or some other identifier associated with the person in the image. As another example, the real world output value may be an audio signal or sample of the name of the person in the image. In other examples, the real world output value may be any other suitable real world signal or value that corresponds with the original input signal. The real world output value may be in any suitable data type or format.

At step 424, the actor 306 outputs the identified real world output value. In one embodiment, the actor 306 may output the real world output value in real-time to a peripheral device (e.g. a display or a speaker). In one embodiment, the actor 306 may output the real world output value to a memory or database. In one embodiment, the real world output value is sent to another sensor 302. For example, the real world output value may be sent to another sensor 302 as an input for another process.

Figure 5:
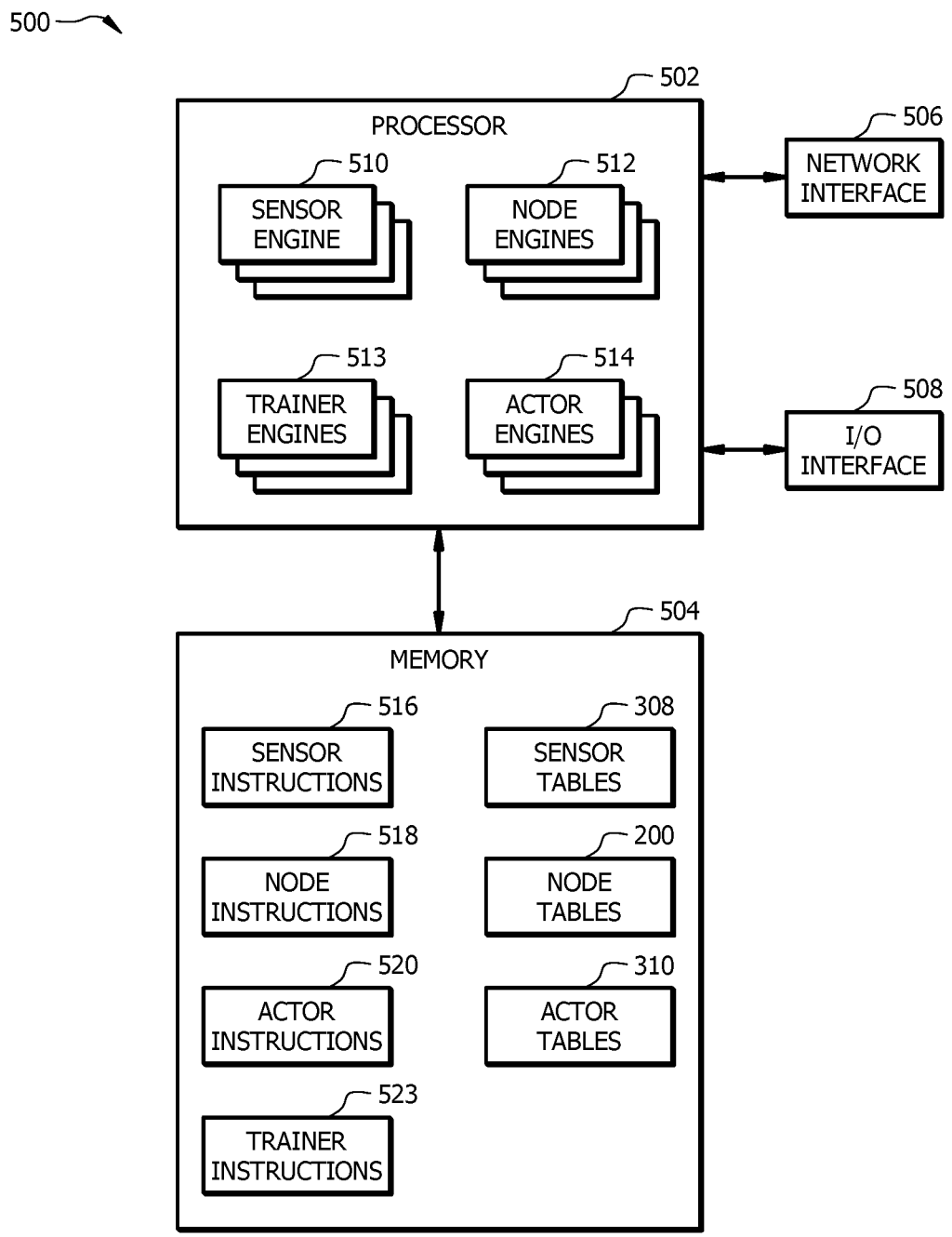
FIG. 5 is a schematic diagram of an embodiment of a computer architecture for emulating a correlithm object processing system.

FIG. 5 is a schematic diagram of an embodiment of a computer architecture 500 for emulating a correlithm object processing system 300 in a user device 100. The computer architecture 500 comprises a processor 502, a memory 504, a network interface 506, and an input-output (I/O) interface 508. The computer architecture 500 may be configured as shown or in any other suitable configuration.

The processor 502 comprises one or more processors operably coupled to the memory 504. The processor 502 is any electronic circuitry including, but not limited to, state machines, one or more central processing unit (CPU) chips, logic units, cores (e.g. a multi-core processor), field-programmable gate array (FPGAs), application specific integrated circuits (ASICs), graphics processing units (GPUs), or digital signal processors (DSPs). The processor 502 may be a programmable logic device, a microcontroller, a microprocessor, or any suitable combination of the preceding. The processor 502 is communicatively coupled to and in signal communication with the memory 204. The one or more processors are configured to process data and may be implemented in hardware or software. For example, the processor 502 may be 8-bit, 16-bit, 32-bit, 64-bit or of any other suitable architecture. The processor 502 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions. For example, the one or more processors are configured to execute instructions to implement sensor engines 510, node engines 512, trainer engines 513, and actor engines 514. In an embodiment, the sensor engines 510, the node engines 512, the trainer engines 513, and the actor engines 514 are implemented using logic units, FPGAs, ASICs, DSPs, or any other suitable hardware. The sensor engines 510, the node engines 512, the trainer engines 513, and the actor engines 514 are each configured to implement a specific set of rules or process that provides an improved technological result.

In one embodiment, the sensor engine 510 is configured to receive a real world value 320 as an input, to determine a correlithm object 104 based on the real world value 320, and to output the correlithm object 104. Examples of the sensor engine 510 in operation are described in FIGS. 4, 6, 7, and 8.

In one embodiment, the node engine 512 is configured to receive a correlithm object 104 (e.g. an input correlithm object 104), to determine another correlithm object 104 based on the received correlithm object 104, and to output the identified correlithm object 104 (e.g. an output correlithm object 104). The node engine 512 is also configured to compute distances between pairs of correlithm objects 104. Examples of the node engine 512 in operation are described in FIGS. 4, 6, 7, and 8.

In one embodiment, the trainer engine 513 implements a trainer configured to facilitate generating new entries in sensor tables 308, node tables 200, and actor tables 310 for a correlithm object processing system. The trainer engine 513 is configured to receive an input signal comprising information for new entries to be generated. The trainer engine 513 is configured to exchange information between a sensor 302, a node 304, and/or an actor 306 to generate entries in sensor tables 308, node tables 200, and actor tables 310, respectively. By generating entries in sensor tables 308, node tables 200, and actor tables 310, the trainer engine 513 is able to extend the functionality of a correlithm object processing system. In other words, the trainer engine 513 helps the correlithm object processing system grow by allowing the correlithm object processing system to handle new inputs and outputs. In one embodiment, when a correlithm object processing system receives an input (e.g. a real world input or a correlithm object) that is not linked with any entries in a sensor table 308, a node table 200, and/or an actor table 310, the correlithm object processing system may be unable to process or perform any operation based on the input. The trainer engine 513 trains the correlithm object processing system by modifying a sensor table 308, a node table 200, and/or an actor table 310 to handle any new inputs or outputs for the correlithm object processing system. Examples of the trainer engine 513 in operation are described in FIGS. 6-8.

In one embodiment, the actor engine 514 is configured to receive a correlithm object 104 (e.g. an output correlithm object 104), to determine a real world output value 326 based on the received correlithm object 104, and to output the real world output value 326. Examples of the actor engine 514 in operation are described in FIGS. 4, 6, 7, and 8.

The memory 504 comprises one or more non-transitory disks, tape drives, or solid-state drives, and may be used as an over-flow data storage device, to store programs when such programs are selected for execution, and to store instructions and data that are read during program execution. The memory 504 may be volatile or non-volatile and may comprise read-only memory (ROM), random-access memory (RAM), ternary content-addressable memory (TCAM), dynamic random-access memory (DRAM), and static random-access memory (SRAM). The memory 504 is operable to store sensor instructions 516, node instructions 518, trainer instructions 523, actor instructions 520, sensor tables 308, node tables 200, actor tables 310, and/or any other data or instructions. The sensor instructions 516, the node instructions 518, trainer instructions 523, and the actor instructions 520 comprise any suitable set of instructions, logic, rules, or code operable to execute a sensor engine 510, a node engine 512, a trainer engine 513, and a actor engine 514, respectively.

The sensor tables 308, the node tables 200, and the actor tables 310 may be configured similar to the sensor tables 308, the node tables 200, and the actor tables 310 described in FIG. 3, respectively.

The network interface 506 is configured to enable wired and/or wireless communications. The network interface 506 is configured to communicate data with any other device or system. For example, the network interface 506 may be configured for communication with a modem, a switch, a router, a bridge, a server, or a client. The processor 502 is configured to send and receive data using the network interface 506.

The I/O interface 508 may comprise ports, transmitters, receivers, transceivers, or any other devices for transmitting and/or receiving data with peripheral devices as would be appreciated by one of ordinary skill in the art upon viewing this disclosure. For example, the I/O interface 508 may be configured to communicate data between the processor 502 and peripheral hardware such as a graphical user interface, a display, a mouse, a keyboard, a key pad, and a touch sensor (e.g. a touch screen).

Figure 6:
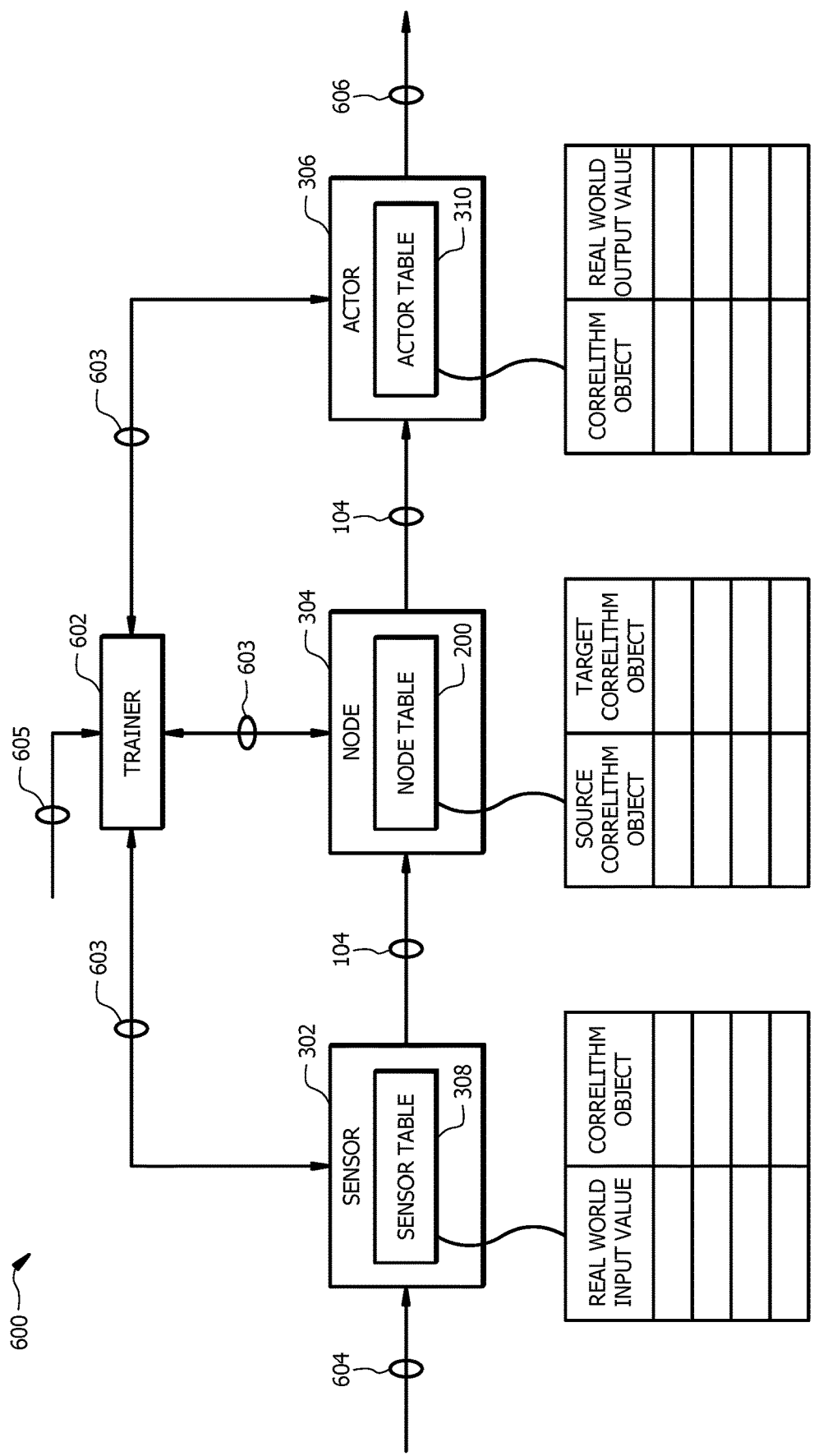
FIG. 6 is a schematic diagram of an embodiment for training a correlithm object processing system.
Figure 7:
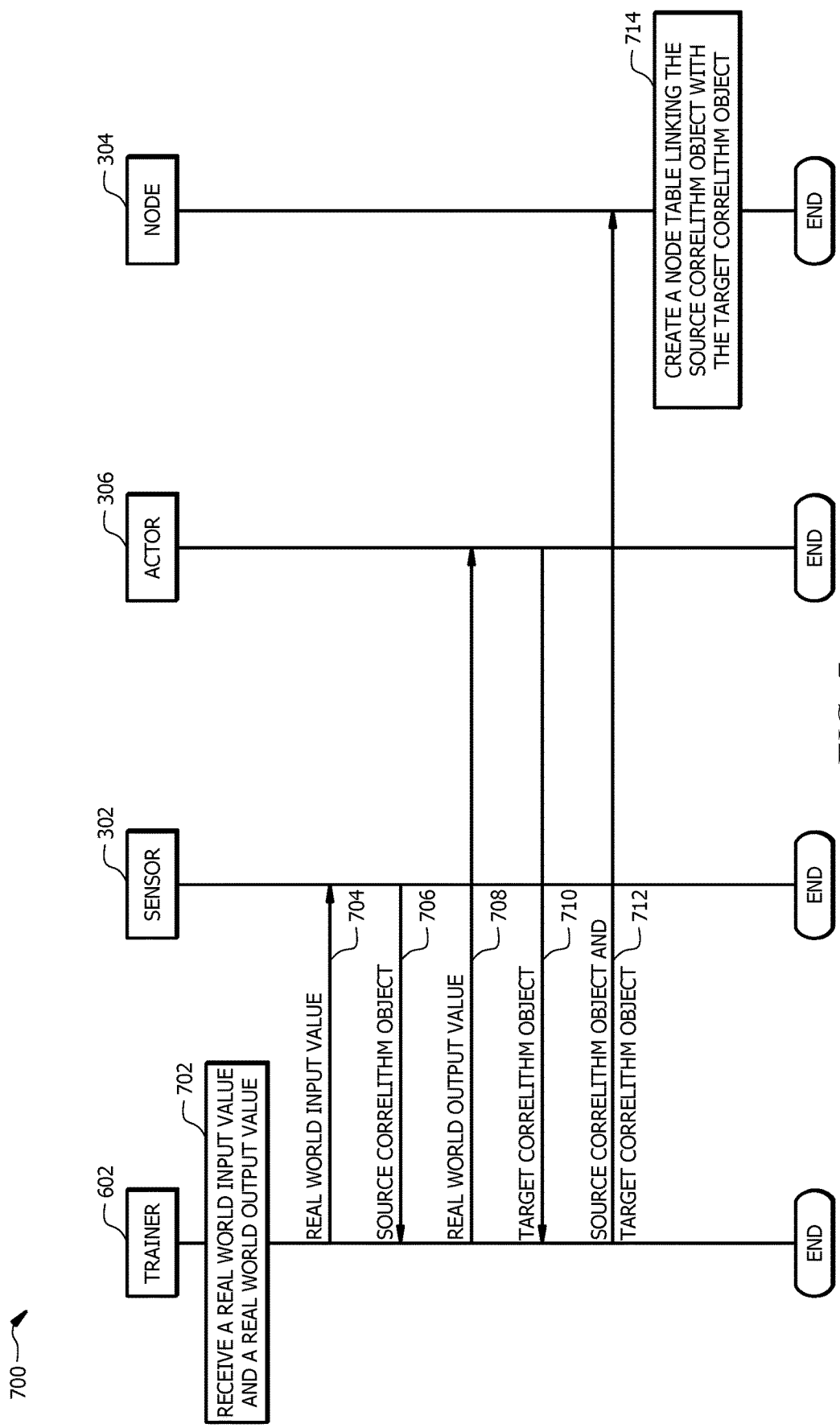
FIG. 7 is a protocol diagram of an embodiment of a correlithm object processing system training flow.
Figure 8:
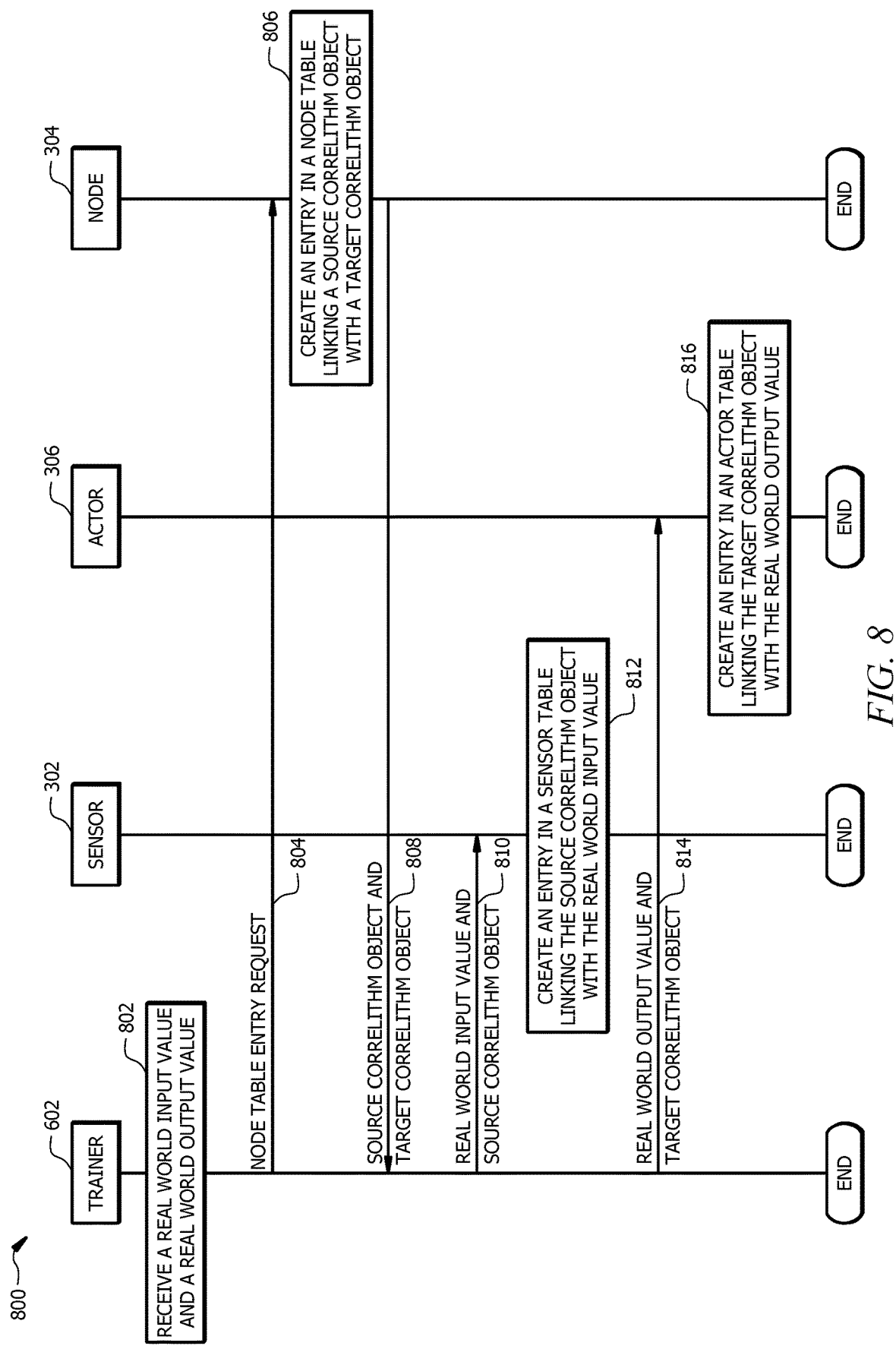
FIG. 8 is a protocol diagram of another embodiment of a correlithm object processing system training flow.

FIGS. 6-8 generally describe an embodiment for training a correlithm object processing system. In FIG. 6-8, the correlithm object processing system comprises a trainer 602 configured to facilitate generating new entries in sensor tables 308, node tables 200, and actor tables 310 for a correlithm object processing system. The correlithm object processing system training process may be implemented to extend the functionality of the correlithm object processing system, for example to handle new real world input values and/or real world output values.

A trainer 602 is generally configured to train the correlithm object processing system 600 by facilitating the generation of new entries in a sensor table 308, a node table 200, and/or an actor table 310. For example, the correlithm object processing system 600 may receive a real word input value 604 that is not linked with any correlithm objects 104 in the correlithm object processing system. In one embodiment, the correlithm object processing system 600 may be unable to process the real world input value 604 without linking it to a correlithm object 104. The trainer 602 is configured to train the correlithm object processing 600 for processing the real world input value 604 by generating new entries in a sensor table 308, a node table 200, and/or an actor table 310. By generating new entries, the trainer 602 increases the functionality of the correlithm object processing system 600 and its ability to handle and process new real world input values 604 and/or real world output values 606. Trainer 602 may be configured to generate entries in individual tables (e.g. a sensor table 308, a node table 200, or an actor table 310) or in a set of tables along an end-to-end path, for example from a sensor 302 to an actor 306.

FIG. 6 is a schematic diagram of an embodiment of a correlithm object processing system 600 that comprises a trainer 602, a sensor 302, a node 304, and an actor 306. In other embodiments, the correlithm object processing system 600 may comprise any other suitable type and/or number of components. The components in the correlithm object processing system 600 may be configured as shown or in any other suitable configuration. In FIG. 6, the sensor 302 is configured to receive a real world input value 604 and to output a correlithm object 104 to the node 304 based on the sensor table 308. The node 304 is configured to receive the correlithm object 104 from the sensor 302 and to output another correlithm object 104 to the actor 306 based on the node table 200. The actor 306 is configured to receive the correlithm object 104 from the node 304 and to output a real world output value 306 based on the actor table 310. The sensor 302, node 304, and actor 306 may be configured to operate similar to the operation described in FIG. 3.

The trainer 602 is in signal communication with the components in the correlithm object processing system 600. The trainer 602 is configured to use any suitable type of the signal channels to send commands or instructions 603 to the components the correlithm object processing system 600. The signal channels may be any suitable type of channel or mechanism for communicating commands 603 to the components in the correlithm object processing system 600. The trainer 602 may be configured to send commands 603 to individual components or multiple components at once. In some embodiments, the trainer 602 may be configured to access a sensor table 308, a node table 200, or an actor table 310 directly to create entries in the table. For example, the trainer 602 may be configured to access a node table 200 directly and create an entry in the node table 200 that links a source correlithm object with a target correlithm object. As another example, the trainer 602 may be configured to access a sensor table 308 directly and to create an entry in the sensor table 308 that links a real world input value 604 with a correlithm object 104. As another example, the trainer 602 may be configured to access an actor table 310 directly and to create an entry in the actor table 310 that links a correlithm object 104 with a real world output value 606.

The trainer 602 is configured to receive an input signal 605. The input signal 605 may be sent by a processor (e.g. processor 502), a controller, an operator, a programmer, a sensor 302, a node 304, an actor 306, or any other suitable source. The input signal 605 is a trigger signal that initiates a correlithm object processing system training process by the trainer 602. Examples of the input signal 605 include, but are not limited to, a function call or a data message. The input signal 605 may identify one or more real world input values, real world output values, and/or correlithm objects 104. For example, the input signal 605 may identify a real world input value 604 and a real world output 606 to be inserted into a correlithm object processing system. As another example, the input signal 605 may also identify particular correlithm objects 104 that are to be linked with the real world input value 604 and/or the real world output 606. The trainer 602 is configured to facilitate the generation of entries in a sensor table 308, a node table 200, and/or an actor table 310 in response to receiving an input signal 605. In one embodiment, the information provided by the input signal 605 may be used to indicate a particular type of correlithm object processing system training method. For example, the input signal 605 may include a flag or value that indicates which type of correlithm object processing system training method to use. Examples of different correlithm object processing system training methods are described in FIGS. 7 and 8.

FIG. 7 is a protocol diagram of an embodiment of a correlithm object processing system training flow 700. Process flow 700 modifies a correlithm object processing system to support a new set of real world input values and real world output values. A user device 100 may implement process flow 700 to train the correlithm object processing system by generating new entries in a sensor table 308, node table 200, and/or an actor table 310. By generating new entries, the trainer 602 increases the functionality of the correlithm object processing system 600 and its ability to handle and process new real world input values 604 and/or real world output values 606. Process flow 700 works by first generating entries in a source table 308 and an actor table 310 for a set of real world input values 604 and a real world output values 606, respectively. Process flow 700 then generates an entry in a node table 200 that links correlithm objects 104 for the real world input value 604 and the real world output value 606.

At step 702, the trainer 602 receives a real world input value 604 and a real world output value 606. The real world input value 604 and the real world output value 606 may be text, numbers, images, audio signals, or any other suitable type of real world values or representations. In one embodiment, the trainer 602 receives the real world input value 604 and the real world value 606 as a request from an operator to add the real world input value 604 and the real world output value 606 to the correlithm object processing system 600. In this example, the trainer 602 modifies sensors 302, nodes 304, and/or actors 306 in the correlithm object processing system to enable the correlithm object processing system to support and process the new set of new real world input values 604 and real world output values 606.

In another embodiment, the trainer 602 receives the real world input value 604 and the real world value 606 after a determination that correlithm objects 104 linked with the real world input value 604 or the real world output value 606 are not present in a node table 200. For example, a node 304 may receive an input correlithm object 104 linked with the real world input value 604 and may compare the input correlithm object 104 to the source correlithm objects in its node table 200 to determine distances (e.g. hamming distances) between the input correlithm object 104 and the source correlithm objects 104. The node 304 may determine distances using any of the previously described techniques. The node 304 determines whether the input correlithm object 104 is present in the node table 200 based on the distances between the input correlithm object 104 and the source correlithm objects 104. For example, the node 304 may determine the input correlithm object 104 is not present in the node table 200 when the input correlithm object 104 does not match (i.e. have a distance of zero) any of the source correlithm objects 104 in the node table 200. As another example, the node 304 may determine the input correlithm object 104 is not present in the node table 200 when the distances between input correlithm object 104 and the source correlithm objects 104 exceed a core distance threshold. The core distance threshold defines how different correlithm objects can be from each other to still be considered a match. For instance, a core distance threshold may be set to 10 bits which means that the input correlithm object 104 and a source correlithm object 104 are considered a match as long as they have no more than 10 bits different from each other. The core distance threshold may be set to any suitable value. The input correlithm object 104 is considered a match with a source correlithm object 104 when the distance between the input correlithm object 104 and a source correlithm object 104 is equal to or less than the core distance.

In another embodiment, the trainer 602 receives the real world input value 604 and the real world output value 606 after a determination that the real world input value 604 and/or the real world output value 606 are not present in a sensor table 308 or an actor table 310, respectively. In these examples, the real world input value 604 and/or the real world output value 606 are not currently supported by the correlithm object processing system. In either of these cases, the trainer 602 receives the real world input value 604 and/or the real world output value 606 as a request to modify the correlithm object processing system to support the real world input value 604 and the real world output value 606.

At step 704, the trainer 602 sends the real world input value 604 to the sensor 302 and, at step 706, receives a source correlithm object 104 from the sensor 302 in response to sending the real world input value 604. For example, the trainer 602 may provide the real world input value 604 to the sensor 302 as a request for the sensor 302 to generate or allocate a source correlithm object 104 based on the real world input value 604. The sensor 302 may generate the source correlithm object 104 by identifying an unused or unmapped correlithm object 104 in the n-dimensional space 102 where the other source correlithm objects 104 in the sensor table 308 are located. The sensor 302 then assigns the identified correlithm object 104 as the source correlithm object 104. As another example, the sensor 302 may apply one or more operations to the real world input value 604 to generate the source correlithm object 104. In other examples, the sensor 302 may generate the source correlithm object 104 using any other suitable technique. In one embodiment, the sensor 302 stores the relationship between the real world input value 604 and the source correlithm object in its sensor table 308 by generating an entry in the sensor table 308 that links the real world input value 604 with the source correlithm object 104.

At step 708, the trainer 602 sends the real world output value 606 to the actor 306, and at step 710, receives a target correlithm object 104 from the actor 306 in response to sending the real world out value 606. For example, the trainer 602 may provide the real world output value 606 to the actor 306 as a request for the actor 306 to generate a target correlithm object 104 based on the real world output value 606. The actor 306 may generate or allocate the target correlithm object 104 by identifying an unused or unmapped correlithm object 104 in the n-dimensional space 102 where the other target correlithm objects 104 in the actor table 310 are located. The actor 306 then assigns the identified correlithm object 104 as the target correlithm object 104. As another example, the actor 306 may apply one or more operations to the real world output value 606 to generate the target correlithm object 104. In this example, the actor 306 is configured to operate in a reverse direction to generate the target correlithm object 104 based on the real world output value 606. In other examples, the actor 306 may generate the target correlithm object 104 using any other suitable technique. In one embodiment, the actor 306 stores the relationship between the real world output value 606 and the target correlithm object 104 in its actor table 310 by generating an entry in the actor table 310 that links the real world output value 606 with the target correlithm object 104.

At step 712, the trainer 602 sends the source correlithm object 104 and the target correlithm object 104 to the node 304. The trainer 602 may provide the source correlithm object 104 and the target correlithm object 104 to the node 304 as a request to generate an entry in its node table 200. At step 714, the node 304 creates an entry in the node table 200 linking the source correlithm 104 with the target correlithm object 104. In another embodiment, the trainer 602 accesses the node table 200 directly and creates an entry in the node table 200 that links the source correlithm object 104 with the target correlithm object 104. Once the sensor table 308, the node table 200, and the actor table 310 have been updated, the correlithm object processing system 600 is then able to handle and process the new real world input values 604 and real world output values 606.

FIG. 8 is a protocol diagram of another embodiment of a correlithm object processing system training flow 800. Similar to the process flow 700 described in FIG. 7, a user device 100 implements process flow 800 to train a correlithm object processing system by generating new entries in a sensor table 308, node table 200, and/or an actor table 310. Process flow 800 works in the reverse order of process flow 700 by first allocating an entry in a node table 200 with a pair of correlithm objects 104 and then linking a real world input value 604 and a real world output value 606 to the correlithm objects 104 in a sensor table 308 and an actor table 310, respectively.

At step 802, the trainer 602 receives a real world input value 604 and a real world output value 606. The trainer 602 may receive the real world input value 604 and the real world output value 606 as part of a process similar to the process described in step 702 of FIG. 7.

At step 804, the trainer 602 sends a node entry request to the node 304 in response to receiving the real world input value 604 and the real world output value 606. The trainer 602 sends the node entry request to trigger the node 304 to generate or allocate an entry in the node table 200 that will be linked with the real world input value 604 and the real world output value 606. The node entry request may be any suitable type of signal or message that triggers the node 304 to generate or allocate an entry in the node table 200. At step 806, the node 304 creates an entry in a node table 200 linking a source correlithm object 104 with a target correlithm object 104. In one embodiment, the node 304 may generate the source correlithm object 104 and the target correlithm object 104 by identifying unused or unmapped correlithm objects 104 in the n-dimensional space 102 where the other source correlithm objects 104 and target correlithm objects 104 are located. The node 304 then assigns the correlithm objects 104 as the source correlithm object 104 and the target correlithm object 104. In other examples, the node 304 may generate the source correlithm object 104 and the target correlithm object 104 using any other suitable technique. In one embodiment, the node 304 stores the relationship between the source correlithm object 106 and the target correlithm object 106 in its node table 200 by generating an entry in the node table 200 that links the source correlithm object 104 with the target correlithm object 104. The node 304 sends the source correlithm object 104 and the target correlithm 104 to the trainer 602 once they have been to the node table 200.

At step 808, the trainer 602 receives the source correlithm object 104 and the target correlithm object 104 from the node 304 in response to sending the node entry request. At step 810, the trainer 602 sends the real world input value 604 and the source correlithm object 104 to the sensor 302. The trainer 602 sends the real world input value 604 and the source correlithm object 104 to the sensor 302 as a request for the sensor 302 to add the real world input value 604 and the source correlithm object 104 to its sensor table 308. At step 812, the sensor 302 creates an entry in the sensor table 308 linking the real world input value 604 and the source correlithm object 104. The sensor 302 stores the relationship between the real world input value 604 and the source correlithm object 104 in its sensor table 308 by generating a new entry in the sensor table 308 that links the real world input value 604 with the source correlithm object 104.

At step 814, the trainer 602 sends the real world output value 606 and the target correlithm object 104 to the actor 306. The trainer 602 may send the real world output value 606 and the target correlithm object 104 to the actor 306 as a request for the actor 306 to add the real world output value 606 and the target correlithm object 104 to its actor table 310. At step 816, the actor 306 creates an entry in the actor table 310 linking the real world output value 606 and the target correlithm object 104. The actor 306 stores the relationship between the real world output value 606 and the target correlithm object 104 in its actor table 310 by generating a new entry in the actor table 310 that links the real world output value 606 with the target correlithm object 104. Similar to process flow 700, once the sensor table 308, the node table 200, and the actor table 310 have been updated, the correlithm object processing system 600 is then able to handle and process the new real world input values 604 and real world output values 606.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system configured to train a correlithm object processing system, comprising:
a node linked with a node table that identifies:
a plurality of source correlithm objects, wherein each source correlithm object is a point in an n-dimensional space represented by a binary string; and
a plurality of target correlithm objects, wherein:
each target correlithm object is a point in the n-dimensional space represented by a binary string, and
each target correlithm object is linked with a source correlithm object from among the plurality of source correlithm objects; and
a trainer operably coupled to the memory, configured to:
receive a real world input value and a real world output value;
send the real world input value to a first interface;
receive a source correlithm object in response to sending the real world value to the first interface;
send a real world output value to a second interface;
receive a target correlithm object in response to sending the real world output value to the second interface;
generate an entry in the node table linking the source correlithm object with the target correlithm object;
the first interface operably coupled to the trainer, configured to:
receive the real world input value; and
generate the source correlithm object linked with the real world input value; and
send the source correlithm object to the trainer; and
the second interface operably coupled to the trainer, configured to:
receive the real world output value; and
generate the target correlithm object linked with the real world output value; and
send the target correlithm object to the trainer.

2. The system of claim 1, wherein the node is configured to:
receive an input correlithm object linked with the real world input value;
compare the input correlithm object to the source correlithm objects in the node table; and
determine the input correlithm object does not match any of the source correlithm objects; and
wherein the trainer receives the real world input value and the real world output value after the node determines that the input correlithm object does not match any of the source correlithm objects.

3. The system of claim 1, wherein the node is configured to:
receive an input correlithm object linked with the real world input value;
determine distances between the input correlithm object and each of the source correlithm objects in the node table, wherein the distance between the input correlithm object and the a source correlithm object is based on the differences between a binary string representing the input correlithm object and binary strings linked with each of the source correlithm objects; and
determine none of the distances are within a core distance threshold; and
wherein the trainer receives the real world input value and the real world output value after the node determines that none of the distances are within the core distance threshold.

4. The system of claim 1, wherein:
generating the entry in the node table comprises sending the source correlithm object and the target correlithm object to the node; and
the node is configured to add the entry to the node table in response to receiving the source correlithm object and the target correlithm object.

5. The system of claim 1, wherein generating the entry comprises:
accessing the node table; and
adding the entry to the node table.

6. The system of claim 1, wherein:
the first interface is linked with a first interface table comprising:
a plurality of correlithm objects;
a plurality of real world input values; and
wherein the second interface table links each correlithm object from the plurality of correlithm objects with a real world input value from the plurality of real world input values; and
the first interface is configured to generate an entry in the first interface table linking the real world input value and the source correlithm object in response to generating the source correlithm object.

7. The system of claim 1, wherein:
the second interface is linked with a second interface table comprising:
a plurality of correlithm objects;
a plurality of real world output values; and
wherein the second interface table links each correlithm object from the plurality of correlithm objects with a real world output value from the plurality of real world output values; and
the second interface is configured to generate an entry in the second interface table linking the real world output value and the target correlithm object in response to generating the target correlithm object.

8. A correlithm object processing system training method, comprising:
receiving, by a trainer engine, a real world input value and a real world output value;
sending, by the trainer engine, the real world input value to a first interface engine;
generating, by the first interface engine, a source correlithm object linked with the real world input value in response to receiving the real world input value, wherein a source correlithm object is a point in an n-dimensional space represented by a binary string;
sending, by the first interface engine, the source correlithm object to the trainer;
sending, by the trainer engine, a real world output value to a second interface engine;
generating, by the second interface engine, a target correlithm object linked with the real world output value in response to receiving the real world output value, wherein a target correlithm object is a point in the n-dimensional space represented by a binary string;
sending, by the second interface engine, the target correlithm object to the trainer;

generating, by the trainer engine, an entry in a node table linking the source correlithm object with the target correlithm object, wherein the node table identifies:
   a plurality of source correlithm objects; and
   a plurality of target correlithm objects, wherein each target correlithm object is linked with a source correlithm object from among the plurality of source correlithm objects.

9. The method of claim 8, further comprising:
   receiving, by a node engine, an input correlithm object linked with the real world input value;
   comparing, by the node engine, the input correlithm object to the plurality of source correlithm objects in the node table; and
   determining, by the node engine, the input correlithm object does not match any of the source correlithm objects; and
   wherein the trainer engine receives the real world input value and the real world output value after the node engine determines that the input correlithm object does not match any of the source correlithm objects.

10. The method of claim 8, further comprising:
   receiving, by a node engine, an input correlithm object linked with the real world input value;
   determining, by the node engine, distances between the input correlithm object and each of the source correlithm objects in the node table, wherein the distance between the input correlithm object and the a source correlithm object is based on the differences between a binary string representing the input correlithm object and binary strings linked with each of the source correlithm objects; and
   determining, by the node engine, none of the distances are within a core distance threshold; and
   wherein the trainer engine receives the real world input value and the real world output value after the node engine determines that none of the distances are within the core distance threshold.

11. The method of claim 8, wherein:
   generating the entry in the node table comprises sending the source correlithm object and the target correlithm object to a node engine; and
   adding, by the node engine, the entry to the node table in response to receiving the source correlithm object and the target correlithm object.

12. The method of claim 8, wherein generating the entry comprises:
   accessing, by the trainer engine, the node table; and
   adding, by the trainer engine, the entry to the node table.

13. The method of claim 8, further comprising adding, by the first interface engine, an entry in a first interface table linking the real world input value and the source correlithm object in response to generating the source correlithm object, wherein the first interface table comprises:
   a plurality of correlithm objects;
   a plurality of real world input values; and
   wherein the first interface table links each correlithm object from the plurality of correlithm objects with a real world input value from the plurality of real world input values.

14. The method of claim 8, further comprising adding, by the second interface engine, an entry in a second interface table linking the real world output value with the target correlithm object in response to generating the target correlithm object, wherein the second interface table comprises:
   a plurality of correlithm objects;
   a plurality of real world output values; and
   wherein the second interface table links each correlithm object from the plurality of correlithm objects with a real world output value from the plurality of real world output values.

15. A computer program product comprising executable instructions stored in a non-transitory computer readable medium such that when executed by a processor causes the processor to emulate a trainer in a correlithm object processing system configured to:
   receive a real world input value and a real world output value;
   send the real world input value to a first interface engine;
   receive a source correlithm object in response to sending the real world value to the first interface engine, wherein a source correlithm object is a point in an n-dimensional space represented by a binary string;
   send a real world output value to a second interface engine;
   receive a target correlithm object in response to sending the real world output value to the second interface engine, wherein a target correlithm object is a point in the n-dimensional space represented by a binary string;
   generate an entry in a node table linking the source correlithm object with the target correlithm object, wherein the node table identifies:
      a plurality of source correlithm objects; and
      a plurality of target correlithm objects, wherein each target correlithm object is linked with a source correlithm object from among the plurality of source correlithm objects.

16. The computer program product of claim 15, wherein the trainer receives the real world input value and the real world output value after a node engine determines that an input correlithm object linked with the real world input value does not match any of the source correlithm objects in the node table.

17. The computer program product of claim 15, wherein the trainer receives the real world input value and the real world output value after a node engine determines that an input correlithm object linked with the real world input value is not within a core distance threshold from any of the source correlithm objects in the node table.

18. The computer program product of claim 15, wherein:
   generating the entry in the node table comprises sending the source correlithm object and the target correlithm object to a node engine; and
   sending the source correlithm object and the target correlithm object to the node engine triggers the node engine to add the entry to the node table.

19. The computer program product of claim 15, wherein generating the entry comprises:
   accessing the node table; and
   adding the entry to the node table.

20. The computer program product of claim 15, wherein:
   sending the real world input value to the first interface engine triggers the first interface engine to generate an entry in a first interface table linking the real world input value with the source correlithm object;
   the first interface table comprises:
      a plurality of correlithm objects;
      a plurality of real world input values; and
      wherein the first interface table links each correlithm object from the plurality of correlithm objects with a real world input value from the plurality of real world input values; and
   sending the real world output value to the second interface engine triggers the second interface engine to generate an entry in a second interface table linking the real world output value with the target correlithm object; and the second interface table comprises:
   a plurality of correlithm objects;
   a plurality of real world output values; and
   wherein the second interface table links each correlithm object from the plurality of correlithm objects with a real world output value from the plurality of real world output values.

\* \* \* \* \*